United States Patent [19]
Torres

[11] 3,946,493
[45] Mar. 30, 1976

[54] DRILL SIGHT FOR AN ELECTRIC HAND DRILL

[76] Inventor: John J. Torres, 2869 Ford, Oakland, Calif. 94601

[22] Filed: June 6, 1974

[21] Appl. No.: 476,779

[52] U.S. Cl. .................... 33/263; 33/276; 33/286; 33/334; 33/370
[51] Int. Cl.² G01C 1/00; G01C 15/00; B23B 45/14
[58] Field of Search ............ 33/263, 276, 282, 283, 33/334, 370, 286

[56] References Cited
UNITED STATES PATENTS

| | | |
|---|---|---|
| 889,273 | 6/1908 | Thomas ................................ 33/370 |
| 1,190,121 | 7/1916 | Critchett............................... 33/245 |
| 2,877,561 | 3/1959 | Morse................................... 33/370 |

FOREIGN PATENTS OR APPLICATIONS

| | | | |
|---|---|---|---|
| 14,995 | 10/1956 | Germany .............................. | 33/370 |

Primary Examiner—Richard E. Aegerter
Assistant Examiner—Steven L. Stephan
Attorney, Agent, or Firm—Theodore J. Bielen, Jr.; Richard Esty Peterson

[57] ABSTRACT

A drill sight for visually estimating the angle at which an electric hand drill is oriented relative to the surface drilled, the drill sight is mounted to the top of the electric drill and has a tubular casing with a hollow bore with internal wall markings and with a cross hair at one opening. By projecting a line of sight normal to the surface drilled and through the cross hair to a selected wall marking, the orientation of the drill can be determined.

8 Claims, 4 Drawing Figures

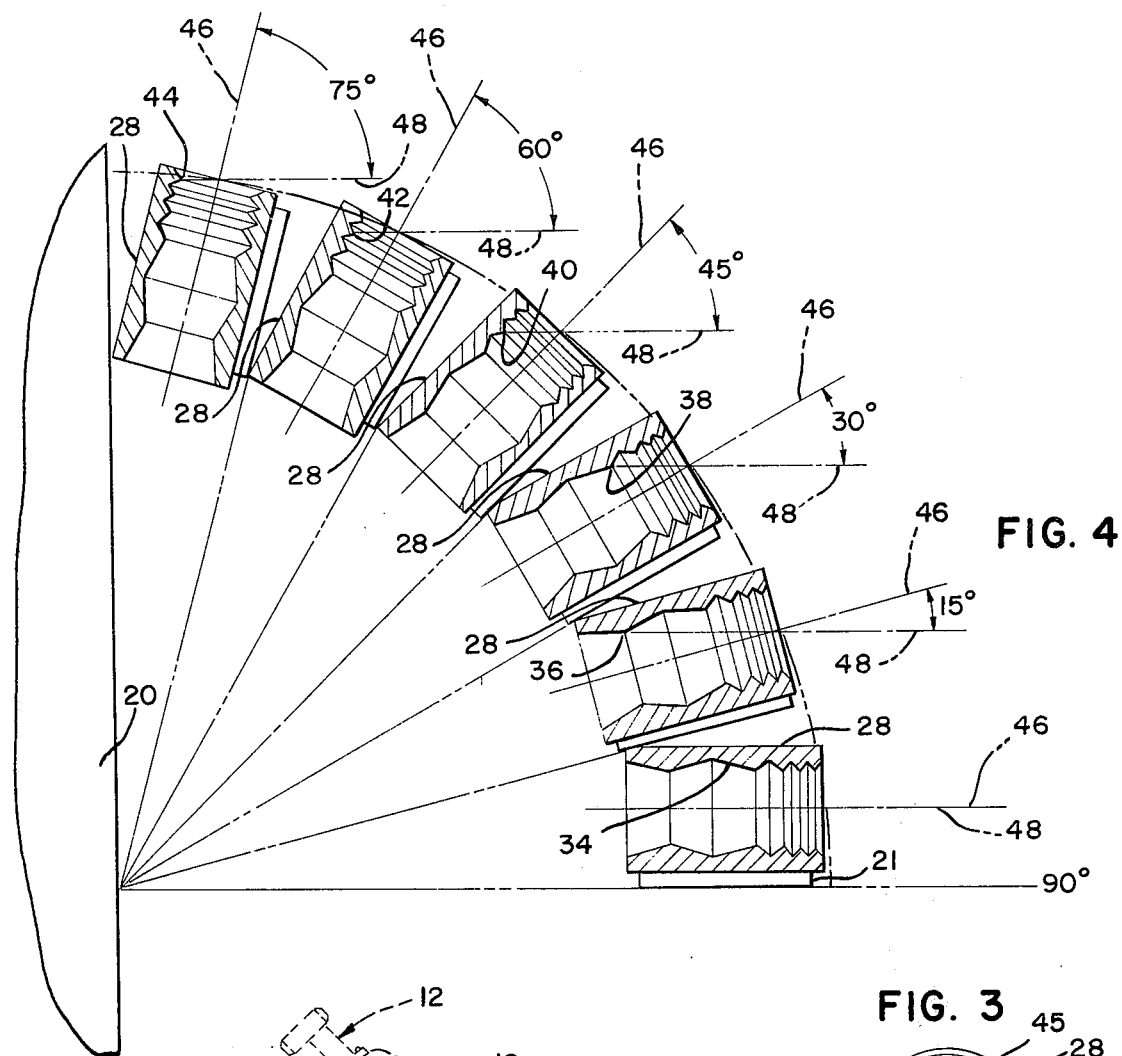
FIG. 4
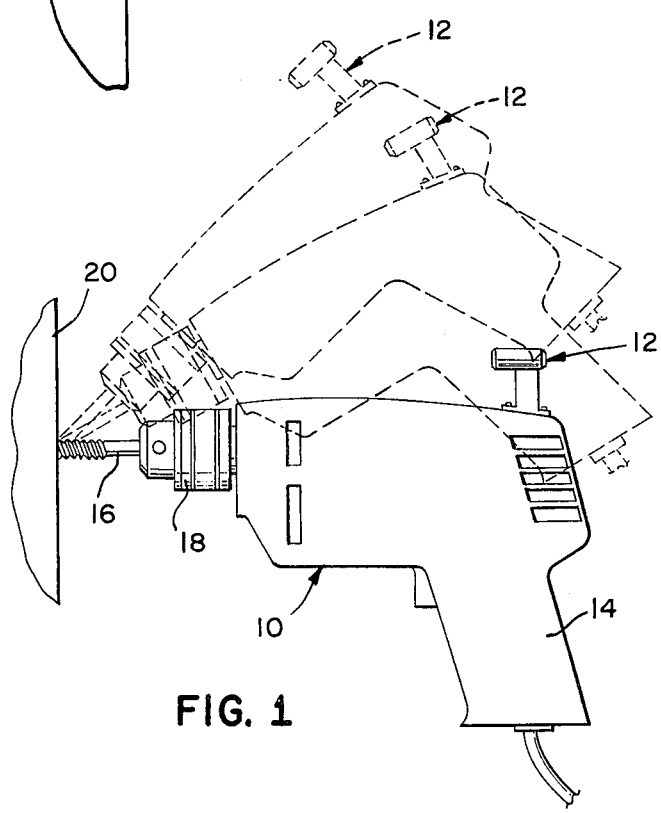
FIG. 1
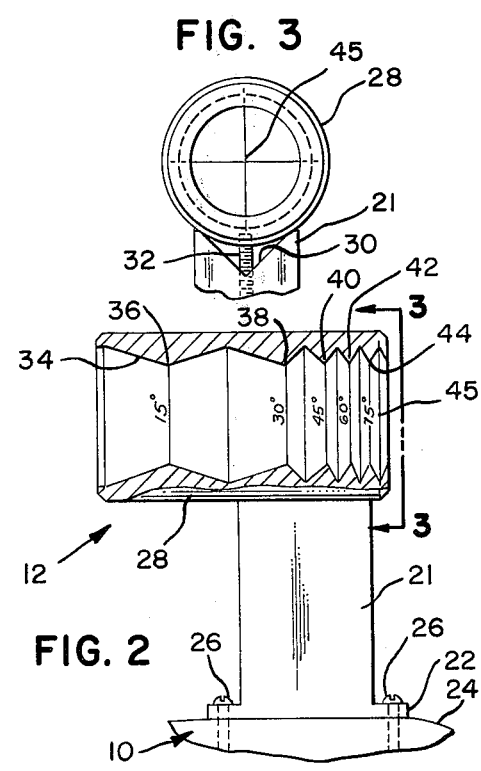
FIG. 3
FIG. 2

DRILL SIGHT FOR AN ELECTRIC HAND DRILL

BACKGROUND OF THE INVENTION

The operator of an electric hand drill often has occasion to drill holes which are not normal; i.e., perpendicular to the surface drilled. In such cases, it has been the practice to set a carpenter's variable angle rule to the desired angle, and, placing the angle rule on the surface to be drilled, the drill is held adjacent to a projecting blade on the angle rule during drilling. This procedure is time consuming and undesirably requires the use of two hands, one to hold the drill and the other to hold the angle rule in position while drilling.

Other supporting carriage attachments for guiding the drill have been suggested but are bulky and must be attached and removed after angularly-directed holes are drilled. Each of these methods is awkward and inefficient.

SUMMARY OF THE INVENTION

This invention relates generally to an attachment to an electric hand drill and, in particular, to a drill sight. The drill sight may be permanently mounted to the top of a hand drill for determining a selected angle of orientation of the drill relative to a workpiece for drilling holes that are desired to be at an angle to the surface of the workpiece. The drill sight is mounted to the top of the drill above the handgrip of a pistol-type electric hand drill. The drill sight has a tubular casing with a generally cylindrical bore. The sight is mounted such that the axis of the cylindrical bore is parallel to the axis of the drill bit. The sight is open at both ends and includes in the preferred embodiment a cross hair at the end oriented toward the handgrip end of the drill. The bore includes a series of discrete markings delineating select angles of orientation of the drill.

Angles of drill orientation are determined by projecting a line of sight normal; i.e., perpendicular to the surface of the workpiece through the cross hair and onto a selected marking in the bore delineating the angle of orientation desired. When so aligned, the drill will be oriented relative to the surface of the workpiece at the angle selected.

BRIEF DESCRIPTION OF THE DRAWINGS

FIG. 1 is an elevational perspective view of a drill and drill sight drilling a workpiece and schematically illustrates, in dotted line, various orientations selectable by use of the drill sight.

FIG. 2 is an enlarged cross-sectional view of the drill sight mounted on a fragmentary portion of the drill.

FIG. 3 is an end view of the drill sight taken on the lines 3—3 in FIG. 2.

FIG. 4 is a schematic illustration of the drill sight in various selectable orientations relative to a fixed workpiece.

DETAILED DESCRIPTION OF THE PREFERRED EMBODIMENT

Referring to FIG. 1, an electric hand drill 10 of the pistol grip type has a drill sight 12 mounted on the top portion of the drill above a handgrip 14. The hand drill 10 has a axis of orientation generally along the axis of a drill bit 16 retained in a chuck 18 at the end of the drill. The drill bit 16 is shown penetrating a workpiece 20 with the orientation of the drill, as defined by the axis of the drill bit, perpendicular to the workpiece 20. A second and third orientation of the drill is schematically illustrated, in dotted line, to show two select orientations that may be made using the drill sight.

Referring now to FIG. 2, the drill sight 12 comprises a mounting column 21 having a base 22 attached to the top ridge 24 of the drill 10 by two small machine screws 26 inserted through holes in column base 22 and threaded into tapped holes in the drill. Rigidly mounted to the top of the mounting column 21 is a tubular casing 28. The casing 28 is secured in a cleft 30 in the top of the column, as shown in FIG. 3, by an elongated machine screw 32 that is inserted up from the base of the column through a countersunk hole prior to installation of the drill sight on the drill.

The drill sight casing 28 has an bore 34 that is generally cylindrical, but with a plurality of indicia markings formed by concentric V-ridges 36, 38, 40, 42, and 44 spaced along the length of the bore. Each V-ridge marking delineates an angular increment of 15° from a line of sight perpendicular to the surface of the workpiece. While different types of markings, such as notches, and different angular increments may be used, the concentric ridge markings spaced at 15° angular increments of orientation of the drill are preferred.

The drill sight is open at each end of the casing. At the end of the casing adjacent the hand grip end of the drill is positioned a cross hair 45, crossing on the central axis 46 of the bore. The cross hair 45 is used as a reference point in projecting a line of sight into the bore. However, the cross hair may be eliminated with only a slight loss in accuracy, the user approximating the center of the bore at the end of the sight casing as a line of sight reference point. With some experience, such approximation is quite accurate.

By aligning a line of sight through the cross hair with a selected reference marking, the axis of the drill will be oriented at a specific angle designated by the marking from the line of sight. By projecting this line of sight perpendicular to a workpiece, a hole can be drilled at the selected angle.

With reference to FIG. 4, a series of cross-sectional views of the drill sight illustrates the orientation of a drill (not shown) having an axis of orientation for drilling parallel to the central axis 46 of the bore. In each case, the line of sight is maintained perpendicular to the workpiece 20. The orientation of the drill sight and, hence, the attached drill is shifted. Alignment of a line of sight 48 along the axis of the bore, as illustrated by the lowermost cross section of the drill sight in FIG. 4, will, of course, orient the drill perpendicular to the workpiece 20. Using this as a reference line for designating the markings, when the drill is shifted such that the line of sight intersects the crown of a 15° ridge marking 36, the drill will drill a hole having an axis of orientation 15° from a line normal to the workpiece if the line of sight 48 is maintained perpendicular to the piece. Similarly, a further shift aligning the sight line 48 with the second ridge marking 38 will result in a 30° axis of orientation from a line normal to the workpiece; a further shift to crown of the third ridge marking 40 will result in a 45° orientation; a further successive shift to the fourth ridge marking 42 will result in a 60° orientation; and a successive shift to the fifth ridge marking 44 will result in a 75° orientation. In this manner, a plurality of incremental angles of the drill can be accomplished quite accurately. Variations from the designated angles can be approximated by sighting between adjacent markings proportionate to the angle deviation from the integral angle designations for the markings.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. A drill sight for attachment to an electric hand drill to determine an angle of drilling relative to a surface of a workpiece the drill sight comprising:
 a. a support structure having means for attaching said support structure to a top portion of an electric hand drill having a defined axis of drilling;
 b. a sight member with first and second ends, said sight member having:
  1. means cooperating with said support structure for mounting said sight member to said support structure;
  2. means for forming a first reference axis parallel to the axis of drilling of the electric hand drill;
  3. means for locating a reference point on the first reference axis substantially at the first end of the sight member;
  4. means for forming at least one second reference axis parallel to and proximately spaced from said first reference axis; and,
  5. a plurality of discrete indicia markings located on the second reference axis between said first and second ends of said sight member, each indicia marking having a predetermined angle designation, wherein each indicia marking is so located on the second reference axis that a line of sight intersecting the reference point on the first reference axis and a selected indicia marking on the second reference axis orients the axis of drilling at the angle designation of the selected indicia marking relative to the surface of a workpiece when the line of sight is maintained normal to the surface of the workpiece.

2. The drill sight of claim 1 wherein said means for forming the first reference axis comprises a casing structure having a substantially cylindrical bore and having an opening at each end of the casing structure, said bore defining a central axis wherein said casing structure cooperates with said mounting means and fixes the central axis of said bore parallel to the axis of drilling, the central axis being coincident with the first reference axis.

3. The drill sight of claim 2 wherein said bore has a wall surface and wherein said means for forming at least one second reference axis parallel to and proximately spaced from said first reference axis comprises at least a longitudinal segment of the wall surface of said bore between said openings.

4. The drill sight of claim 3 wherein said indicia markings comprise discretely spaced marks on at least the longitudinal segment of the wall surface of said bore.

5. The drill sight of claim 4 wherein said indicia markings comprise V-ridges arranged along the bore concentric to said central axis.

6. The drill sight of claim 4 wherein said indicia markings are discretely arranged for angle designations having 15° increments.

7. The drill sight of claim 2 wherein said means for forming said reference point comprises said central axis of said bore and an opening of said casing structure.

8. The drill sight of claim 2 wherein said means for forming said reference point comprises a cross hair at one opening of said casing structure.

* * * * *